Patented Aug. 4, 1942

2,292,198

UNITED STATES PATENT OFFICE 2,292,198

MANUFACTURE OF SILICATE-ANHYDRITE COMPOSITIONS

John D. Carter, Lansdowne, Pa., assignor to Philadelphia Quartz Company, Philadelphia, Pa., a corporation of Pennsylvania No Drawing. Continuation of application Serial No. 118,140, December 29, 1936. This application October 30, 1939, Serial No. 302,055

11 Claims. (Cl. 106—77)

This invention relates to manufacture of silicate-anhydrite compositions; and it includes compositions of matter suitable for use as wall plasters, cements, stuccos, mortars, adhesives and the like; said compositions, comprising aqueous solutions of alkali metal silicates mixed with finely divided anhydrite, said anhydrite having been pretreated while in a finely divided state with an alkali metal silicate solution, under conditions producing a superficial gel coating over the anhydrite particles, the effect of said gel coating being to produce compositions having a delayed and predetermined time of set. This invention also includes the gel coated anhydrite as a product and methods of making the same, as well as methods of making said silicate-anhydrite compositions; all as more fully hereinafter set forth and as claimed.

This application is a continuation of my prior copending application, Serial Number 118,140, filed December 29, 1936. The claims of this prior application were limited to processes of producing the described gel coated anhydrite particles and setting compositions containing the same, as well as the resulting setting compositions as products. The present application includes claims to the gel coated particles as products, this forming an important part of the present invention.

Calcium sulfate occurs in several different forms in nature, all of which have found wide commercial usage with the exception of anhydrite. Anhydrite occurs abundantly in many parts of the United States and many attempts have been made to find uses for this material. But it has been found extremely difficult to hydrate, even by steam under pressure, and its slow reactivity makes it unsuitable even as a retarding agent for Portland cement. It has been proposed to add various salts, including sodium silicate, in small proportions to anhydrite in order to speed up the hydration. These salts appear to have what might be called a catalytic action on the hydration. While a set by hydration occurs more rapidly in the presence of such salts, the set compositions are not sufficiently strong for most purposes and, although this action has been known for approximately fifty years, it has never been employed commercially to any important extent. The present invention provides a treatment for anhydrite which makes it available for several important commercial uses.

I have found that, when finely divided anhydrite is mixed with ordinary water glass, a quick setting composition is produced, but that the time of setting may be readily delayed over any reasonable time interval by pretreatment of the anhydrite particles with a relatively dilute alkali metal silicate solution. This pretreatment produces a gel coating on the outside of the particles of anhydrite, which coating dissolves slowly and produces a delayed reaction when the anhydrite is mixed with a more concentrated silicate solution.

It has been previously proposed to mix calcium sulfate, in the form of plaster of Paris, with acid proof cements containing sodium silicate in order to increase their speed of setting. I have found that when plaster of Paris is dispersed among the grains of silica (commonly used in such cements), reaction occurs very rapidly when the sodium silicate is added. Some of the silicate is practically destroyed, so far as liquefying or bonding action is concerned. In order to secure a good working texture, a disadvantageous amount of either silicate or water must be added. On the other hand, with my pretreated anhydrite, the chemical reaction does not occur until after time has been afforded to apply the cement. The present invention thus meets a long felt need for an inexpensive, chemically-setting silicate cement which allows time for application, and then within a few hours, develops a strength and uniformity of structure which otherwise could be reached only after several days, if ever.

For given amounts of calcium sulfate and silicate, substantially stronger masses can be produced if the calcium sulfate in silicate cements is added in the form of my preheated anhydrite. Moreover, the resulting cement sets hard throughout its whole mass, due to the formation of calcium silicate in situ, instead of hardening slowly by drying on the surface with the interior remaining soft over a considerable time interval, as in the usual cement. A set by chemical reaction is produced, as distinguished from a set by hydration. To produce such a set it is necessary of course, to mix the coated anhydrite particles, in the presence or absence of additional ingredients, with sufficient strong silicate solution to react with the anhydrite present to produce, upon setting, sufficient calcium silicate to serve as a binder for the mass. The gel coated anhydrite particles of my invention may be used in moist condition immediately after coating or they may be dried by any conventional means and used in the dry condition. Drying may be conducted in the presence of the coating solution or may be accomplished after the separation of the particles from the solution, but the particles must be recovered from the solution by mechanical separation or by drying while still reactive with solutions of alkali metal silicates and before any substantial setting takes place. The coated anhydrite may be mixed with alkali metal silicate solutions of varying concentration and with other additions if desired, in order to produce compositions of widely different character which are suitable for many different uses.

If the anhydrite is added in proportions at least equivalent to the sodium oxide present in the silicate solutions, the resulting composition has a neutral reaction, as will be evident from the following equation of reaction:

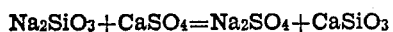

$$Na_2SiO_3 + CaSO_4 = Na_2SO_4 + CaSiO_3$$

A somewhat more general equation of reaction is

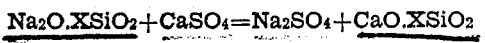

$$Na_2O \cdot XSiO_2 + CaSO_4 = Na_2SO_4 + CaO \cdot XSiO_2$$

Any anhydrite in excess of the proportions indicated functions as an inert filler.

It has long been desired to produce a silicate cement having a neutral reaction. The present discovery therefore opens up a wide range of new uses for silicate cements besides improving the results obtained in many fields where the alkaline reaction of the usual silicate cements is at least disadvantageous. An example of this is in the production of fiber board lamination where injury to the rosin size might result from a cement which is too alkaline.

My invention can be explained in more detail by reference to the following specific examples which illustrate certain compositions within the purview of my invention and with which favorable results have been obtained in actual practice.

Example 1

I moistened with water 5 parts of anhydrite, which had been ground to such fineness that about 90 per cent passed a 200 mesh screen, and then mixed this into a dilute silicate of soda solution heated to a temperature of about 85° C. This dilute silicate of soda solution was formed by taking 10 parts of a silicate of soda having a density of 41° Baumé, with a ratio of $Na_2O$ to $SiO_2$ of 1 to 3.22, and mixing it with 90 parts of water. Heating and stirring of the mixture were continued for about 1 minute. Then, after settling for a minute or two, the bulk of the supernatant liquor was poured off and the treated anhydrite was recovered by filtering off the remaining liquor. The anhydrite, while still in the moist condition, was then mixed with 10 parts of the same 41° Baumé silicate. This mixture was found to set within about 15 minutes to a solid mass having considerable crushing strength. The properties of this composition adapt it for use as a cement where great quickness of set is desired.

Example 2

The procedure of the preceding example was followed with the exception that the treatment at 85° C. was continued for 3 minutes. The treated anhydrite obtained was then mixed with 10 parts of the above described 41° Baumé silicate solution. This mixture was found to set in about an hour. The properties of this composition make it useful in brick-laying where a moderate rate of setting is required.

Example 3

I mixed 3 parts of finely ground anhydrite with 10 parts of the dilute silicate solution used in Example 1. This mixture was heated and stirred at a temperature of about 90° C. for about 10 minutes. The treated anhydrite recovered from this operation was then mixed with a concentrated sodium silicate solution, formed by diluting 94 parts of the above described 41° Baumé silicate solution with 6 parts of water. I also added 15 parts of fine clay. The resulting mixture was found to set within about 4 hours. The properties of this composition were found to adapt it particularly for use as an adhesive in making articles from paper stock, etc.

Example 4

I took 3 parts of anhydrite, ground to about 200 mesh and treated it, at room temperature, for 30 minutes with 100 parts of a 10 per cent solution of sodium silicate of 59° Baumé gravity and $1Na_2O$ to $2SiO_2$ ratio. The solid matter was separated from the bulk of the liquid by filtration. I then mixed 2 parts of the damp solids with 10 parts of sodium silicate of 41° Baumé gravity and $1Na_2O$ to $3.22SiO_2$ ratio, and with 3 parts of a finely ground hydrous clay. The composition formed in this manner was found suitable for use as an adhesive. It remains sufficiently liquid to be pumped and successfully applied for several hours.

Example 5

Treated anhydrite was produced as in the preceding example. 3 parts of the resulting damp solids were mixed with 10 parts of the 41° Baumé silicate mentioned above, 3 parts of water, and 27 parts of fine silica sand. The resulting composition was found to form an excellent acid-resisting cement. It remains workable for about two hours and then sets throughout its mass.

Example 6

Anhydrite was treated as in Example 4. 3 parts of the damp solids were mixed with 10 parts of the same 41° Baumé silicate mentioned above, 3 parts of water and 17 parts of whiting. The resulting composition was found suitable for use as a plaster. It remains workable with a trowel for two hours and then sets throughout its mass.

The sodium silicate used in the above examples may be replaced by potassium or other alkali metal silicates. It is evident, from the properties of the compositions obtained in the above examples, that the setting time can be closely controlled by the time of treatment in the dilute silicate solutions. The thicker the gel coating produced on the anhydrite particles, the longer the time of set.

The gel coatings of my invention can be produced in aqueous solutions of alkali metal silicates ranging in concentration from about 2 to 90 per cent by weight and having ratios of $Na_2O$ to $SiO_2$ ranging from about 1:4 to 1:1; these values differing to some extent with the temperature and time of treatment. These coatings may be formed either in the cold or by heating the silicate solutions. Their formation is accelerated by heating. When dilute silicate solutions are used, optimum results are obtained by heating the anhydrite with the silicate at a temperature ranging from about 20° to 90° C. for about 1 to 30 minutes, the shorter treating periods being employed with the higher temperatures and the more concentrated solutions.

The gel coating formed on the anhydrite particles by the methods described can be identified readily by treating the gel coated particles with solutions of dyes such as methylene blue, safranine, crystal violet and malachite green. The gel coating exhibits a preferential absorption for the dye and can be distinguished easily under the microscope from the cores of anhydrite which, of course, exhibit the phenomenon of birefringence when viewed between crossed Nichol prisms. Uncoated particles of anhydrite in contrast are not colored by these dyes to any appreciable extent. The coated particles can also be distinguished from the uncoated particles by the fact that they tend to roll in lumps while untreated particles of anhydrite flow smoothly like sand. The coated product also contains many aggregates formed by agglomeration of the particles during the coating treatment. Furthermore while the untreated anhydrite has an apparent specific gravity of about 0.919, the treated product of the present invention has an apparent specific gravity falling within the limits of about 0.45 to 0.55.

The pretreated anhydrite of the present invention can be mixed in various proportions with any of the known silicate cements. Compositions having widely varying properties result. The anhydrite serves to some extent as an inert solid and can be used to replace part or all of the clays which are used in many silicate compositions. When the pretreated anhydrite is mixed with a small amount of concentrated silicate solution the resulting mixture has many of the properties of plaster of Paris mixed with water. This mixture can be molded and cast, a sharp reproduction of all details in the structure of the mold being obtained. Stuccoes for the external coating of buildings can be produced which are highly resistant to weather. Acid proof and refractory cements can be produced. Special cements can be made which are adapted for use in setting fire bricks in furnace linings, for sealing cracks in furnace walls, for sealing fire boxes, for mending saggars, for constructing digester linings, acid proof chimneys and acid towers, for abrasive wheel bonds, for making molded wood flour products, for sealing spark plugs, etc.

While it is advantageous for many purposes to employ the pretreated anhydrite in proportions at least equivalent to the sodium oxide present in the silicate solutions, this is not necessary when compositions having a neutral reaction are not required. Neutral compositions having a wide range of properties can be obtained by varying the ratio of $Na_2O$ to $SiO_2$ in the silicate solutions employed and when varying the amount of anhydrite in a corresponding manner. Additional variations in properties may be secured by adding clays or other solids. The ratio of $Na_2O$ to $SiO_2$ of the silicate solution used in my compositions can be varied from about 1:4 to 1:1.58. Sufficient anhydrite may be used to produce a pasty composition or thinly fluid suspensions may be employed. Adhesives can be made within the present invention which set sufficiently slowly to be capable of being pumped from a central mixing point to their place of use over a period of several hours. Such mixtures produce an initial set upon drying. Chemical reaction, for which some moisture must be retained, proceeds more slowly.

Various addition agents can be employed in my compositions. An addition of zinc oxide, for example, assists in increasing the water resistance of my cements. Ground limestone, whiting or some other form of calcium carbonate can be added. Finely ground asbestos and alumina are useful in some compositions. Pigments, inert solids and fillers may be added. In fact any of the additions which have been suggested in connection with prior art silicate cements and silicate-clay compositions are useful in the present invention. As stated in my prior acknowledged application, I have found that lead chloride is an equivalent of anhydrite in my process and I consider the use of this material, in place of the anhydrite, to be within the scope of the present invention.

When a delayed reaction is desired, I have found that the advantages from the use of my pretreated anhydrite, may be secured when dry, solid silicates are used. Some of these silicates dissolve rather rapidly when mixed with water. As they do so the they will react with any untreated anhydrite present, and may bring on a setting action which is more rapid than is sometimes desired. In such cases the setting time of these compositions may be greatly lengthened by the use of my pretreated anhydrite. When slowly soluble solid silicates are used in such compositions the concentration of silicate builds up slowly upon the addition of water. In this case the gel coatings, which are characteristic of the pretreated anhydrite employed in the present invention, may be formed as the silicate dissolves. And as the silicate becomes more completely dissolved, delayed chemical reaction and setting then takes place.

While I have described what I consider to be the best embodiments of my invention many modifications will be immediately evident to those skilled in this art. Such modifications as fall within the scope of the following claims, I consider part of my invention.

What I claim is:

1. In the process of manufacturing chemically setting silicate-anhydrite compositions, the steps which comprise treating finely divided anhydrite particles with a solution of an alkali metal silicate under conditions producing the formation of a superficial, siliceous gel coating on the anhydrite particles without any substantial setting taking place, and recovering the gel coated particles from the solution while still reactive with solutions of alkali metal silicates.

2. In the manufacture of chemically setting compositions containing anhydrite and alkali metal silicate and suitable for use as mortars, plasters, cements, stuccos, adhesives and the like, the process which comprises treating finely divided anhydrite particles with a solution of sodium silicate under conditions producing the formation of a superficial, siliceous gel coating on the anhydrite particles without any substantial setting taking place, recovering the gel coated particles from the solution while still in reactive condition, mixing them with a substantial proportion of a concentrated solution of sodium silicate in sufficient quantities to produce a strongly setting composition due to the formation in situ of calcium silicate, said setting being slower than that produced in the absence of said gel coating.

3. The process of claim 2 wherein the mixture of said concentrated solution of sodium silicate and said anhydrite particles contains at least sufficient anhydrite to react with the silicate in accordance with the equation $$Na_2O.XSiO_2 + CaSO_4 = Na_2SO_4 + CaO.XSiO_2$$

4. The process of claim 2 wherein the said gel coating is produced by treatment of the anhydrite particles in a solution of sodium silicate ranging in concentration from 2 to 90 per cent by weight and having a ratio of Na₂O to SiO₂ ranging from about 1:1 to 1:4 while said concentrated solution of sodium silicate has a ratio ranging from about 1:1.58 to 1:4.

5. In the manufacture of chemically setting compositions containing anhydrite and alkali metal silicates and suitable for use as mortars, plasters, cements, stuccos, adhesives and the like, the process which comprises treating finely divided anhydrite particles with a dilute solution of sodium silicate under conditions producing the formation of a superficial, siliceous gel coating on the anhydrite particles without any substantial setting taking place, mixing the resulting gel coated particles while in reactive condition with an inert filler and a substantial proportion of a concentrated solution of sodium silicate in quantity sufficient to produce a strongly setting composition due to the formation in situ of calcium silicate, said setting being slower than that produced in the absence of said gel coating.

6. A composition of matter suitable for use as a mortar, plaster, cement, stucco, adhesive or the like, comprising a concentrated solution of an alkali metal silicate in admixture with finely divided particles of anhydrite covered with a superficial, siliceous gel coating producing a delayed time of set with said silicate solution, the gel coated anhydrite particles and the alkali metal silicate being present in substantially equimolecular proportions; said composition producing a strong set due to the formation in situ of calcium silicate.

7. As a new product, finely divided particles of anhydrite covered with a superficial, siliceous gel coating, the said gel coating covering the entire surface of said particles and exhibiting a preferential adsorption for dyes, said product tending to roll in lumps, containing many agglomerated particles and having an apparent specific gravity falling within the range of about 0.45 to 0.55; said particles of anhydrite being reactive, when mixed with silicate solutions, to form strongly setting compositions suitable for use as mortars, plasters, cements, stuccos and adhesives, said mixtures setting more slowly than similar compositions containing uncoated anhydrite particles.

8. As a new product, finely divided particles of anhydrite covered with a superficial, siliceous gel coating, said product tending to roll in lumps, containing many agglomerated particles and having an apparent specific gravity falling within the range of about 0.45 to 0.55, said gel coating covering the entire surface of said particles and having a preferential adsorption for dyes and having been formed by subjecting the anhydrite particles to the action of a solution of an alkali metal silicate followed by separation of the particles from the solution while still reactive with solutions of alkali metal silicates and before any substantial setting takes place; said particles of anhydrite being reactive, when mixed with silicate solutions, to form strongly setting compositions suitable for use as mortars, plasters, cements, stuccos and adhesives, said mixtures setting more slowly than similar compositions containing uncoated anhydrite particles.

9. A composition of matter suitable for use as a mortar, plaster, cement, stucco, adhesive or the like, comprising a concentrated solution of an alkali metal silicate in admixture with finely divided particles of anhydrite covered with a superficial, siliceous gel coating exhibiting a preferential adsorption for dyes and being capable of substantially delaying the chemical reaction between the anhydrite particles and the silicate solution, the said coated particles of anhydrite having an apparent specific gravity within the limits of about 0.45 to 0.55, the said composition having a time of set substantially slower than a similar composition in which the anhydrite particles are free from said gel coating, the quantity of silicate solution being sufficient to react with the anhydrite present to produce, upon the setting of the composition, sufficient calcium silicate to serve as a binder for the composition as a whole.

10. The composition of claim 9 wherein the anhydrite present is at least sufficient to react with the silicate solution in accordance with the equation $$Na_2O.XSiO_2 + CaSO_4 = CaO.XSiO_2 + Na_2SO_4$$

11. A dry composition of matter suitable for use as a mortar, plaster, cement, stucco, adhesive or the like, comprising a finely divided, slowly-soluble solid alkali metal silicate and finely divided anhydrite; the said silicate having a rate of solution sufficiently low to produce a superficial, siliceous gel coating on the particles of anhydrite upon the addition of water to said composition and prior to complete solution of said silicate, the said composition containing at least sufficient anhydrite to react with the silicate in accordance with the equation $$Na_2O.XSiO_2 + CaSO_4 = Na_2SO_4 + CaO.XSiO_2$$

and setting upon the addition of water due to the formation of calcium silicate, the time of setting being longer than with corresponding compositions not producing said superficial gel coating; the quantity of slowly-soluble alkali metal silicate present in said composition being sufficient to produce, upon the setting of the composition, sufficient calcium silicate to serve as a binder for the composition as a whole.

JOHN D. CARTER.